(12) United States Patent
Ito et al.

(10) Patent No.: US 7,825,065 B2
(45) Date of Patent: Nov. 2, 2010

(54) PARTICLES FOR CATALYST AND METHOD FOR PRODUCING SAME

(75) Inventors: Miho Ito, Hoi-gun (JP); Yasushi Hayashi, Gifu (JP)

(73) Assignee: Denso Corporation, Kariya (JP)

( * ) Notice: Subject to any disclaimer, the term of this patent is extended or adjusted under 35 U.S.C. 154(b) by 766 days.

(21) Appl. No.: 11/598,811

(22) Filed: Nov. 13, 2006

(65) Prior Publication Data

US 2007/0117718 A1 May 24, 2007

(30) Foreign Application Priority Data

Nov. 18, 2005 (JP) ............................. 2005-333661

(51) Int. Cl.
*B01J 23/00* (2006.01)
(52) U.S. Cl. ...................... 502/338; 502/326; 502/336; 502/406
(58) Field of Classification Search ................. 502/326, 502/336, 338, 406
See application file for complete search history.

(56) References Cited

U.S. PATENT DOCUMENTS

| | | | | | |
|---|---|---|---|---|---|
| 2,378,905 | A | * | 6/1945 | Bates | 208/134 |
| 3,461,150 | A | * | 8/1969 | Callahan | 558/325 |
| 3,778,488 | A | * | 12/1973 | Croce et al. | 585/621 |
| 3,852,361 | A | * | 12/1974 | Haas et al. | 568/474 |
| 3,872,027 | A | * | 3/1975 | Christmann et al. | 502/324 |
| 4,093,561 | A | * | 6/1978 | Nishikawa et al. | 502/336 |
| 4,243,443 | A | * | 1/1981 | Utracki | 149/35 |
| 4,374,270 | A | * | 2/1983 | Ruszala et al. | 562/599 |
| 4,434,298 | A | * | 2/1984 | Ruszala | 562/599 |
| 4,624,942 | A | * | 11/1986 | Dyer et al. | 502/330 |
| 4,668,657 | A | * | 5/1987 | Jennings | 502/328 |
| 4,751,070 | A | * | 6/1988 | Pai Verneker | 423/594.1 |
| 4,921,830 | A | * | 5/1990 | Kolts | 502/326 |
| 4,975,407 | A | * | 12/1990 | Dejaifve et al. | 502/330 |
| 5,061,586 | A | * | 10/1991 | Saha et al. | 430/111.2 |
| 5,656,566 | A | * | 8/1997 | Ward | 502/316 |
| 5,668,075 | A | * | 9/1997 | Milam et al. | 502/338 |
| 5,759,948 | A | * | 6/1998 | Takaoka et al. | 502/325 |
| 5,770,172 | A | * | 6/1998 | Linehan et al. | 423/561.1 |
| 5,846,507 | A | * | 12/1998 | Liu et al. | 423/362 |

(Continued)

FOREIGN PATENT DOCUMENTS

JP    A-2000-153160    6/2000

(Continued)

OTHER PUBLICATIONS

Office action dated Aug. 24, 2010 in corresponding Japanese Application No. 2005-333661.

*Primary Examiner*—Cam N Nguyen
(74) *Attorney, Agent, or Firm*—Harness, Dickey & Pierce, PLC

(57) ABSTRACT

Particles for catalyst which have a function of absorbing and desorbing oxygen, the particles comprising an iron compound in which an element, other than Fe, having two valences is solid-soluted in an oxide of Fe having three valences, and a method for producing the particles for catalyst which comprises precipitating a precipitate containing Fe having three valences and an element, other than Fe, having two valences from a solution containing ions of Fe having three valences and ions of the element, other than Fe, having two valences, and drying and firing the precipitate to produce the particles.

6 Claims, 1 Drawing Sheet

U.S. PATENT DOCUMENTS

| | | | | |
|---|---|---|---|---|
| 5,866,501 A | * | 2/1999 | Pradhan et al. | 502/338 |
| 6,028,027 A | * | 2/2000 | Baier et al. | 502/300 |
| 6,060,420 A | | 5/2000 | Munakata et al. | |
| 6,436,868 B1 | * | 8/2002 | Imai et al. | 502/185 |
| 6,551,958 B1 | * | 4/2003 | Baier et al. | 502/304 |
| 6,656,520 B2 | * | 12/2003 | de Nora | 427/77 |
| 6,756,339 B1 | * | 6/2004 | Rokicki et al. | 502/304 |
| 6,852,669 B2 | * | 2/2005 | Voit et al. | 502/338 |
| 6,864,384 B2 | * | 3/2005 | Brazdil et al. | 558/325 |
| 7,022,256 B2 | * | 4/2006 | Uegami et al. | 252/181 |
| 7,427,580 B2 | * | 9/2008 | Ward et al. | 502/316 |
| 7,549,427 B2 | * | 6/2009 | Dellinger et al. | 131/342 |
| 2002/0006862 A1 | * | 1/2002 | Schmidt | 502/150 |
| 2004/0007498 A1 | * | 1/2004 | Gislason et al. | 208/15 |
| 2005/0266986 A1 | | 12/2005 | Tanaka et al. | |

FOREIGN PATENT DOCUMENTS

| | | |
|---|---|---|
| JP | A-2000-165042 | 6/2000 |
| JP | A-2001-198461 | 7/2001 |
| JP | 2003-175337 | 6/2003 |
| JP | 2004-041866 | 2/2004 |
| JP | 2004-041946 | 2/2004 |
| JP | A-2004-136179 | 5/2004 |

* cited by examiner

PARTICLES FOR CATALYST AND METHOD FOR PRODUCING SAME

BACKGROUND OF THE INVENTION

1. Field of the Invention

The present invention relates to particles for catalyst which have a function of absorbing and desorbing oxygen, and a method for producing the particles for catalyst. For example, the particles for catalyst can be used as a promoter (co-catalyst) of an automobile exhaust gas purification catalyst.

2. Description of the Related Art

As an automobile catalyst for removing hazardous components such as HC, CO and NOx, from an automobile exhaust gas, for example, noble metals such as Pt, Pd and Rh are used. These noble metals are supported on the surface of a carrier such as alumina so as to increase a contact area with the exhaust gas, and thus various hazardous components are purified.

In the automobile catalyst, it is necessary to control an air-fuel ratio (A/F), which varies depending on engine operation conditions, in a fixed narrow range so as to increase a purification rate. Therefore, an oxygen sensor maintains the A/F and provides optimum combustion conditions and reaction conditions for purification of an exhaust gas.

However, a trace amount of a hazardous gas contained in the exhaust gas is actually purified by adsorbing on a catalytic noble metal or a promoter on a carrier and causing the catalytic reaction therewith. Proceeding a series of these reaction processes requires high purification performances because reaction conditions, particularly gas composition, have to be maintained in considerably micro-sized small space.

In a current engine system, it is impossible to sufficiently exhibit purification performances of the catalyst only by a macro-controlled A/F value. Therefore, a function capable of controlling the A/F value in the micro-sized space is required to the catalyst itself. It is an action referred to as an oxygen storage ability (OSC capacity) of the automobile catalyst, which attain such a function, and a promoter (co-catalyst) plays the role.

The particles for catalyst are used as the promoter, and ceria or a ceria-zirconia solid solution, having a function capable of absorbing or desorbing oxygen, namely, an OSC capacity is generally employed (see, for example, Japanese Unexamined Patent Publication (Kokai) Nos. 2001-198461, 2000-153160 and 2004-136179).

SUMMARY OF THE INVENTION

Recently, automobile exhaust gas regulations have become more severe, and it is required that the automobile catalyst purifies a hazardous component with high efficiency. Under these circumstances, it is required to develop particles for catalyst having a more improved OSC capacity than that of a conventional ceria or ceria-zirconia solid solution.

In light of the above problems, the present invention has been made and an object thereof is to provide particles for catalyst having a more improved OSC capacity.

To achieve this object, first, the present inventors selected an oxide of Fe having three valences as the material of particles for catalyst. Although Fe has two or three valences as a stable valence, when applied to an automobile catalyst, it is used under a high temperature range of about 800° C. and, therefore, the material having three valences, which is stable at high temperature, was selected.

Furthermore, it is important to enable oxygen defects to exist in the particles so as to allow the material to function as particles for catalyst capable of absorbing or desorbing oxygen. The present inventors considered that, in the case of using an iron (Fe) compound in which an element other than Fe having two valences is solid-soluted in an oxide of Fe having three valences, oxygen defects are formed by a difference in valence in the iron compounds. The present invention has been experimentally found as a result of a study based on such an idea.

Namely, a first feature of the present invention resides in particles for catalyst, which have a function of absorbing and desorbing oxygen, containing an iron (Fe) compound in which an element other than Fe having two valences is solid-soluted in an oxide of Fe having three valences. Here, the term "an element other than Fe having two valences" does not include oxygen ($O^{2-}$).

The first feature can provide particles for catalyst having more improved OSC capacity than that of a conventional catalyst, as is shown in Table 1, described below.

When a primary particle size of particles for catalyst is adjusted to 100 nm or less, a specific surface area of the particles for catalyst can be extraordinarily increased. Examples of the element other than Fe having two valences, which can be solid-soluted in an oxide of Fe, include an alkali metal, a transition metal element and others.

A second feature of the present invention resides in the particles for catalyst having the first feature, wherein, assumed that the total proportion of Fe having three valences and the element other than Fe having two valences is 100 atomic % in the iron compound, the proportion of the element other than Fe having two valences is 1 atomic % or more and 10 atomic % or less.

When the proportion of the element having two valences other than Fe is adjusted to 1 atomic % or more and 10 atomic % or less, the OSC capacity can be improved more properly.

A third feature of the present invention resides in the particles for catalyst having the first or second feature, which are entirely formed from the iron compound, and a fourth feature thereof resides in the particles for catalyst having the first or second feature, comprising a core portion formed from an oxide of Fe having three valences as a main component, the iron compound constituting a layer formed on the outer peripheral surface of the core portion.

Although the particles for catalyst may be entirely made of an iron compound, an oxygen defect site can be concentratedly formed on the surface of the particles by forming the iron compound on the surface of the core portion.

A fifth feature of the present invention resides in a method for producing the particles for catalyst having the third feature, which comprises the steps of precipitating a precipitate containing Fe having three valences and an element other than Fe having two valences from a solution containing ions of Fe having three valences and ions of the element other than Fe having two valences, and drying and firing the precipitate.

By using a coprecipitation method in a liquid phase, particles for catalyst made entirely of the iron compound can be properly produced.

In this production method, the precipitate formed in the liquid phase can exist in the form of primary particles, but almost all of the particles are in the form of secondary particles formed by agglomeration of primary particles. This is because the product agglomerated by an intermolecular force or a ζ (zeta) potential is energetically stable.

Therefore, in the particles for catalyst obtained after drying and firing of the precipitate, the particles are likely to be in the form of secondary particles. However, it is apparent that primary particles are more advantageous than secondary particles because the surface area is high.

Taking this fact into consideration, a sixth feature of the present invention resides in the method for producing the particles for catalyst having the fifth feature, which comprises the steps of preparing a dispersion solution containing the precipitate dispersed therein, applying physical impacts to the dispersion solution to thereby crush the precipitate, and drying and firing the precipitate.

As described above, by applying a physical impact, in the liquid phase, to thereby crush the precipitate, the precipitate in the form of secondary particles can be converted into fine primary particles. Also, the particles for catalyst obtained by drying and firing the crushed precipitate are likely to be in the form of secondary particles.

A seventh feature of the present invention resides in a method, for producing the particles for catalyst having the fourth feature, which comprises the steps of precipitating a first precipitate containing Fe having three valences from an aqueous solution containing ions of Fe having three valences, depositing a second precipitate comprising the first precipitate and an element other than Fe having two valences deposited on the surface of the first precipitate, from a solution prepared by mixing a dispersion solution containing the first precipitate dispersed therein with a solution containing ions, of the element other than Fe, having two valences, and drying and firing the second precipitate.

According to this method, the first precipitate is converted into a precursor of the core portion and the second precipitate obtained by depositing the element other than Fe having two valences on the surface of the precursor is fired, and therefore particles for catalyst comprising a core portion and the iron compound provided on the surface of the core portion can be properly produced.

A eighth feature of the present invention resides in the method, for producing the particles for catalyst having the seventh feature, which comprises the steps of preparing a dispersion solution containing the first precipitate dispersed therein, and applying a physical impact to the dispersion solution thereby crushing the first precipitate, and mixing the dispersion solution with a solution containing ions of the element other than Fe having two valences.

According to this method, the first precipitate as the precursor of the core portion in the form of secondary particles can be converted into fine primary particles. The particles for catalyst obtained by subjecting to the following process treatment using the crushed primary precipitate are likely to be in the form of primary particles.

DESCRIPTION OF THE PREFERRED EMBODIMENTS

Figure 1:
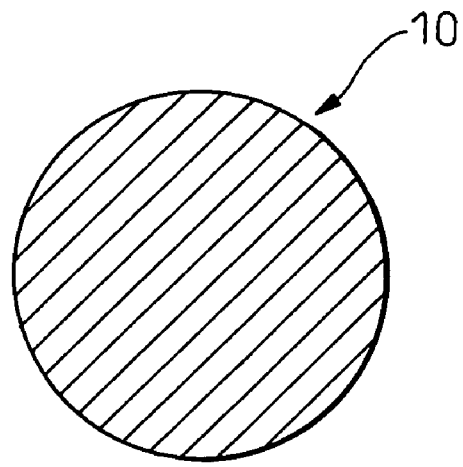
FIG. 1 is a cross-sectional view of particles for catalyst according to one embodiment of the present invention, in which particles for catalyst are entirely made of a Fe compound.
Figure 2:
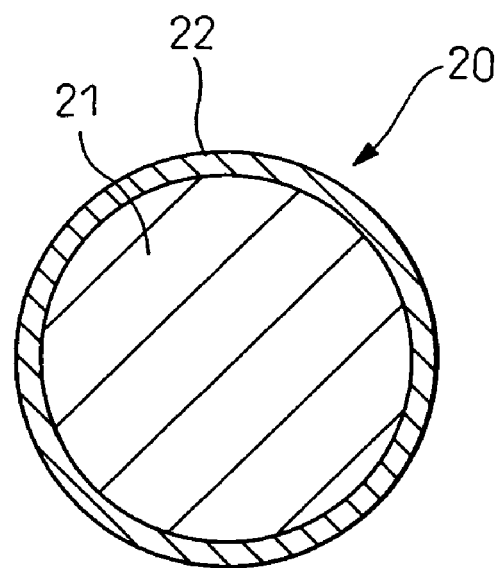
FIG. 2 is a cross-sectional view of particles for catalyst according to another embodiment of the present invention, in which particles for catalyst comprise a core portion and a layer made of an iron compound on the surface thereof.

Embodiments of the present invention will now be described with reference to the accompanying drawings. FIGS. 1 and 2 are each a schematic view showing a cross section of particles for catalyst according to the preferred embodiments of the present invention. FIG. 1 shows an example of particles for catalyst 10 which are entirely made of an iron (Fe) compound, and FIG. 2 shows an example of particles for catalyst 20 comprising a core portion 21 and a layer 22 made of an iron compound on the surface of the core portion.

The particles for catalyst of the embodiments shown in FIGS. 1 and 2 have a function capable of absorbing and desorbing oxygen, and contain an iron compound in which an element other than Fe having two valences is solid-soluted in an oxide of Fe having three valences.

Hereinafter, Fe having three valences is referred to as a "trivalent Fe" and an oxide of the trivalent Fe is referred to as a "trivalent Fe oxide", and also the element other than Fe having two valences is referred to as a "divalent element". The iron compound in which the divalent element is solid-soluted in the trivalent Fe oxide is merely referred to as a "Fe compound".

The particles for catalyst 10 shown in FIG. 1 are entirely made of a Fe compound, and the core portion 21 of the particles for catalyst 20 shown in FIG. 2 is made mainly of a trivalent Fe oxide and a layer 22 made of the Fe compound is formed on the outer peripheral surface of the core portion 21.

As used herein, the divalent element is not specifically limited but must be solid-soluted in a trivalent Fe oxide and examples thereof include alkali metal element such as Ca, Mg, Sr or Ba element and transition metal element such as Co, Ni or Cu element.

A Fe compound is formed by solid-soluting one or more kinds of these divalent elements in the trivalent Fe oxide. By solid-soluting these divalent elements, a difference in valence of the trivalent Fe oxide is caused and an oxygen defect site is structurally formed in the Fe compound. Thus, oxygen can be absorbed or desorbed in this oxygen defect site.

The proportion of the divalent element to be added in the Fe compound is not specifically limited, but is preferably within a range from 1 to 10 atomic % assumed that the total proportion of the trivalent Fe and the divalent element is 100 atomic % in the Fe compound, taking account of the existence of a lot of oxygen defects and extent of solid solution to the trivalent Fe oxide.

For example, in the particles for catalyst 10 shown in FIG. 1 and the layer 22 shown in FIG. 2, the composition comprising 95 atomic % of the trivalent Fe and 5 to 10 atomic % of Ca and the composition comprising 95 atomic % of the trivalent Fe and 5 to 10 atomic % of Mg can be employed.

It is considered to be important that the oxygen defect site is allowed to exist on the surface of the particles for catalyst. This reason is considered as follows. Namely, when the oxygen defect site exists in the particles for catalyst, absorption or desorption of oxygen through internal diffusion can be conducted, but the speed is insufficient in view of the absorption or desorption speed.

Examples of the method of realizing this purpose include a method of increasing the proportion of the divalent element existing on the surface of the particles for catalyst, namely, a method of increasing a specific surface area of the particles for catalyst, and a method of concentratedly forming the oxygen defect site on the surface of the particles for catalyst.

As the method of increasing the specific surface area, a method of converting the particles for catalyst into fine particles to form nano particles is effective. Therefore, in the particles for catalysts 10 and 20 shown in FIGS. 1 and 2, the primary particle size is preferably adjusted to 100 nm or less.

The method of concentratedly forming the oxygen defect site on the surface of the particles for catalyst includes a method of forming a layer 22 made of a Fe compound on the surface of a core portion 21 of the particles for catalyst 20, as is illustrated in FIG. 2.

By forming the layer 22 made of the Fe compound on the surface of the core portion 21, the oxygen defect site can be concentratedly formed on the surface of the particles for catalyst. The thickness of the layer 22 is not specifically limited, but it is considered to be substantially 20 nm or less taking into account the diffusion of oxygen.

These particles for catalysts 10 and 20 are installed in an automobile and can function as a promoter for purification of an automobile exhaust gas. Specifically, these particles are installed in an automobile after being supported on a carrier such as cordierite together with a catalyst such as Pt, or supporting a catalyst such as Pt on the surface of the particles for catalysts 10 and 20. The particles for catalysts 10, 20 of this embodiment may be used in combination with a conventional promoter such as ceria.

The particles for catalysts 10 and 20 shown in FIGS. 1 and 2 can be produced by synthesizing an oxide using a commonly used solid phase method, but is preferably produced by synthesizing an oxide from an element level using a liquid phase because the particles for catalysts are preferably nanometer sized fine particles having high specific surface areas.

Specifically, a synthesis method using a liquid phase coprecipitation method is exemplified. First, with respect to the particles for catalyst 10 shown in FIG. 1, a solution containing ions of trivalent Fe and ions of a divalent element is prepared. For example, an aqueous solution containing a Fe nitrate and a Ca nitrate is prepared so that the proportion of Fe is from 99 to 90 atomic % and the proportion of Ca is from 1 to 10 atomic %.

By adding an alkaline auxiliary precipitant such as ammonia or diethanolamine to the aqueous solution, a precipitate containing trivalent Fe and a divalent element is precipitated. Then, this precipitate is dried and fired. Consequently, particles for catalyst 10 shown in FIG. 1 are obtained.

In this production method, the solution may be irradiated with microwaves when the precipitate is deposited. The microwaves may be the same as those emitted by a conventional microwave oven.

When the solution is irradiated with microwaves, as a molecular motion in the solution is activated by internal heating, the reaction rate is remarkably improved and it becomes possible to synthesize it at a high rate. Because of a short reaction time, severe turbulence in crystal orientation occurs and particles for catalyst containing many oxygen defects can be synthesized, and thus it is expected to provide high performance particles for catalyst.

On the other hand, with respect to the particles for catalyst 20 shown in FIG. 2, a first precipitate containing trivalent Fe is precipitated from an aqueous solution containing ions of trivalent Fe such as Fe nitrate. Subsequently, a dispersion solution is prepared by dispersing a product obtained by separating the first precipitate and drying in a solution such as water.

Then, a solution is prepared by mixing this dispersion solution with a solution containing ions of a divalent element. In the preparation, the proportions of the trivalent Fe and ions of the divalent element contained in the dispersion solution are adjusted to within the above preferable range of the atomic %.

Then, a second precipitate deposited on the surface of the first precipitate of the divalent element is precipitated from this mixed solution, and this second precipitate is dried and fired. At this time, the second precipitate is dried and fired in a state where the divalent element is deposited on the surface of the first precipitate containing trivalent Fe.

Therefore, a Fe compound is formed by solid-solution both divalent and trivalent components at an interface between a layer of the divalent element and trivalent Fe as a substrate and, as shown in FIG. 2, particles for catalyst 20 comprising a core portion 21 made mainly of an oxide of trivalent Fe and a layer 22 made of a Fe compound provided on the surface of the layer are obtained.

In the method for producing the particles for catalyst 20 shown in FIG. 2, a dispersion solution containing the first precipitate dispersed therein and a solution containing ions of the divalent element are mixed. At this time, in the solution containing ions of the divalent element, ions of trivalent Fe and ions of the divalent element may be mixed in each proportion of atomic % within the above range.

Also in the method for producing the particles for catalyst 20 shown in FIG. 2, the solution may be irradiated with microwaves when the precipitate is precipitated. In this case, the solution may be irradiated with microwaves when the first precipitate and/or the second precipitate are precipitated.

In the method for producing the particles for catalyst 10 shown in FIG. 1 and the method for producing the particles for catalyst 20 shown in FIG. 2, as described above, particles for catalyst in the form of secondary particles formed by agglomeration of primary particles because of synthesis in a liquid phase.

In these production methods, by applying a physical impact to the precipitate in a liquid phase when a precipitate is precipitated in the production methods, and thereby crushing the precipitate, the agglomerated precipitate in the form of secondary particles can be disintegrated to form fine particles in the form of primary particles.

Specifically, in the method for producing the particles for catalyst 10 shown in FIG. 1, a precipitate containing trivalent F and a divalent element is separated and dispersed in a solution such as pure water before drying to obtain a dispersion solution. Then, the precipitated is crushed by applying a physical impact to this dispersion solution.

In the method for producing the particles for catalyst 20 shown in FIG. 2, as the particle size of the particles for catalyst 20 is mostly controlled by the core portion 21, the first precipitate as a precursor of the core portion 21 is subjected to a crushing treatment through the same physical impact.

Specifically, the first precipitate containing trivalent Fe is once separated and then dispersed in pure water to prepare a dispersion solution. Then, the first precipitate is crushed by applying a physical impact to the dispersion solution before mixing the dispersion solution with a solution containing ions of a divalent element.

Examples of the specific method of applying a physical impact to a liquid phase include irradiation of the solution with ultrasonic wave, and stirring of the solution using a mixer capable of rotating at high speed.

The detailed mechanism of crushing in these methods has not yet been clearly understood, but is considered that a jet flow is generated in a liquid phase by these methods and, at that time, bubbles (cavitation) generated microscopically are ruptured and the precipitate is crushed by the impact.

EXAMPLES

The particles for catalyst according to the present invention will now be described in more detail by the following examples and comparative examples, but the present invention is not limited to these examples.

Example 1

A Fe nitrate and a Ca nitrate were dissolved in water in a ratio Fe:Ca of 95:5 (unit: atomic %). To this solution, ammonia as an auxiliary precipitant was gradually added dropwise while stirring, thereby alkalifying the aqueous solution, and then a precipitate containing trivalent Fe and Ca as a divalent element was precipitated by coprecipitation.

After sufficient coprecipitation, the precipitate was washed with water and separated by a centrifuge. The precipitate was dried at 120° C. and fired at 500° C. for 2 hours to obtain particles for catalyst 10 made of a Fe compound in which Ca is solid-soluted in a trivalent Fe oxide.

Example 2

In the same manner as in Example 1, except that the ratio Fe:Ca is changed to 99:1, particles for catalyst 10 made of a Fe compound in which Ca is solid-soluted in a trivalent Fe oxide were obtained.

Example 3

In the same manner as in Example 1, except that the ratio Fe:Ca is changed to 90:10, particles for catalyst 10 made of a Fe compound in which Ca is solid-soluted in a trivalent Fe oxide were obtained.

Example 4

This example is an example in which the divalent element Ca in Example 1 is replaced by Mg. A Fe nitrate and a Mg nitrate were dissolved in water in a ratio Fe:Mg of 95:5 (unit: atomic %). To this solution, ammonia as an auxiliary precipitant was gradually added dropwise while stirring, thereby alkalifying the aqueous solution, and then a precipitate containing trivalent Fe and Mg as a divalent element was precipitated by coprecipitation.

After sufficient coprecipitation, the precipitate was washed with water and separated by a centrifuge. The precipitate was dried at 120° C. and fired at 500° C. for 2 hours to obtain particles for catalyst 10 made of a Fe compound in which Mg is solid-soluted in a trivalent Fe oxide.

Example 5

This example is an example in which the divalent element Ca in Example 1 is replaced by Co. A Fe nitrate and a Co nitrate were dissolved in water in a ratio Fe:Co of 95:5 (unit: atomic %). To this solution, ammonia as an auxiliary precipitant was gradually added dropwise while stirring, thereby alkalifying the aqueous solution, and then a precipitate containing trivalent Fe and Co as a divalent element was precipitated by coprecipitation.

After sufficient coprecipitation, the precipitate was washed with water and separated by a centrifuge. The precipitate was dried at 120° C. and fired at 500° C. for 2 hours to obtain particles for catalyst 10 made of a Fe compound in which Co is solid-soluted in a trivalent Fe oxide.

Example 6

This example is an example in which ammonia as the auxiliary precipitant in Example 1 was replaced by diethanolamine. A Fe nitrate and a Ca nitrate were dissolved in water in a ratio Fe:Ca of 95:5 (unit: atomic %). To this solution, diethanolamine as the auxiliary precipitant was gradually added dropwise while stirring, thereby alkalifying the aqueous solution, and then a precipitate containing trivalent Fe and Ca as a divalent element was precipitated by coprecipitation.

After sufficient coprecipitation, the precipitate was washed with water and separated by a centrifuge. The precipitate was dried at 120° C. and fired at 500° C. for 2 hours to obtain particles for catalyst 10 made of a Fe compound in which Ca is solid-soluted in a trivalent Fe oxide.

Example 7

This example is an example in which microwaves were used in Example 1. Irradiation with microwaves was conducted using a commercially available microwave apparatus.

An Fe nitrate and a Ca nitrate were dissolved in water in a ratio Fe:Ca of 95:5 (unit: atomic %). To this solution, a small amount of ammonia as an auxiliary precipitant was added dropwise, thereby alkalifying the aqueous solution, and then a precipitate containing trivalent Fe and Ca as a divalent element was precipitated by coprecipitation while irradiating microwave for 5 minutes with stirring in a pressure resistant container.

After sufficient coprecipitation, the precipitate was washed with water and separated by a centrifuge. The precipitate was dried at 120° C. and fired at 500° C. for 2 hours to obtain particles for catalyst 10 made of a Fe compound in which Ca is solid-soluted in a trivalent Fe oxide.

Example 8

This example and Example 9 described hereinafter are examples in which particles for catalyst 20 comprising a core portion 21 and a layer 22 made of a Fe compound provided on the outer peripheral surface of the core portion are produced, as shown in FIG. 2. Note, Examples 1 to 7 were examples in which the particles for catalyst 10 are those illustrated in FIG. 1 and entirely made of the Fe compound.

Only Fe nitrate was dissolved in water. To this solution, ammonia as an auxiliary precipitant was gradually added dropwise, thereby alkalifying the aqueous solution, and then a first precipitate containing trivalent Fe was precipitated.

After sufficient coprecipitation, the first precipitate was washed with water and separated by a centrifuge. Then, the first precipitate was dispersed in a small amount of water to prepare a dispersion solution and the dispersion solution was irradiated with ultrasonic waves, and also the first precipitate in the form of agglomerated secondary particles was crushed into primary particles by physical impact and dispersed in the dispersion solution.

Then, a solution was prepared by dissolving Fe nitrate and Ca nitrate in water in a ratio Fe:Ca of 95:5 (unit: atomic %). This aqueous solution and the dispersion solution containing the first precipitate were mixed.

Subsequently, ammonia as an auxiliary precipitant was gradually added dropwise to the mixed solution while stirring, thereby alkalifying the aqueous solution, and then a second precipitate comprising the first precipitate and a deposit containing trivalent Fe and Ca as an auxiliary precipitant deposited on the surface of the first precipitate was precipitated.

After sufficient coprecipitation, the second precipitate was washed with water and separated by a centrifuge. The precipitate was dried at 120° C. and fired at 500° C. for 2 hours to obtain particles for catalyst 20 comprising a core portion 21 made of a trivalent Fe oxide and a layer 22 made of a Fe compound in which Ca is solid-soluted in a trivalent Fe oxide provided on the surface of the core portion.

Example 9

In the same manner as in Example 8, a first precipitate containing trivalent Fe was precipitated from an aqueous solution containing only a Fe nitrate in water while applying a physical impact through irradiation with ultrasonic waves to prepare a dispersion solution containing the first precipitate crushed to primary particle level.

Then, a mixed solution was prepared by dissolving a Ca nitrate as a divalent element in the dispersion solution. In this example, the preparation was conducted so that Fe:Ca is 95:5 (unit: atomic %) in the level of a Fe nitrate and a Ca nitrate as raw materials.

To the mixed solution, ammonia as an auxiliary precipitant was gradually added dropwise while stirring, thereby alkalifying the aqueous solution, and then a second precipitate comprising the first precipitate and a deposit containing Ca as a divalent element deposited on the surface of the first precipitate was precipitated.

After sufficient coprecipitation, the second precipitate was washed with water and separated by a centrifuge. The precipitate was dried at 120° C. and fired at 500° C. for 2 hours to obtain particles for catalyst 20 comprising a core portion 21 made of a trivalent Fe oxide and a layer 22 made of a Fe compound in which Ca is solid-soluted in a trivalent Fe oxide provided on the surface of the core portion.

Example 10

In the same manner as in Example 1, except that the Fe:Ca ratio was changed to 80:20, particles for catalyst 10 made of a Fe compound in which Ca is solid-soluted in a trivalent Fe oxide were obtained.

Comparative Example 1

This example is an example in which the divalent element is not added to trivalent Fe in Example 1. In the same manner as in Example 1, except that the Fe:Ca ratio was changed to 100:0, particles for catalyst 10 made of a trivalent Fe oxide were obtained.

Comparative Example 2

This example is an example in which a ceria-zirconia solid solution as a conventional promoter is obtained. A Ce nitrate and a Zr nitrate were dissolved in water in a Ce:Zr ratio of 1:1 (unit: atomic ratio). To this aqueous solution, ammonia as an auxiliary precipitant was gradually added dropwise while stirring, thereby alkalifying the aqueous solution, and a precipitate containing ceria and zirconia was precipitated.

After sufficient coprecipitation, the precipitate was washed with water and separated by a centrifuge. The precipitate was dried at 120° C. and fired at 500° C. for 2 hours to obtain particles for catalyst made of a ceria-zirconia solid solution oxide.

Characteristics of Particles for Catalyst According to Examples and Comparative Examples:

With respect to the particles for catalyst obtained in the above-described examples and comparative examples, XRF (fluorescent X-ray analysis) measurement was conducted so as to examine the elemental composition and XRD (X-ray diffraction) measurement was conducted so as to conduct structural analysis.

The primary particle size was measured by observation using TEM (transmission electron scope) and the dispersion state of particles for catalyst was examined by measuring an average particle size using a particle size distribution measuring apparatus. Furthermore, the specific surface area of particles for catalyst was measured by a specific surface area measuring apparatus.

As a result of the XRF measurement, in all examples, the composition corresponding the aimed value, namely, the composition prepared in a raw material level was detected. For example, a raw material was prepared in a ratio Fe:Ca of 95:5 in Example 1, and the XRF measurement revealed that Fe:Ca was 94.7:5.3.

The XRD measurement revealed that a main peak is a peak attributed to $F_2O_3$ as a trivalent Fe oxide and a peak attributed to CaO, MgO or CoO was not detected and therefore a Fe compound in which a divalent element such as Ca, Mg or Co is solid-soluted in $F_2O_3$ is formed in the respective examples.

In Example 10, in addition to crystal patterns of $F_2O_3$, crystal patterns of CaO were slightly observed. Namely, solid-soluting of 20 atomic % of Ca in $F_2O_3$ is considered to be as follows. Ca, which could not be completely solid-soluted, exists alone as an oxide because of excess Ca.

The TEM observation revealed that the resulting particles for catalyst are particles for catalyst made of crystal grains having a primary particle size of about 20 to 30 nm in all examples. It was also revealed that a layer 22 having a thickness of about 5 nm was further formed on a core portion 21 having a primary particle size of about 20 to 30 nm in Examples 8 and 9. Namely, it was revealed that particles for catalyst 20 shown in FIG. 2 are formed in Examples 8 and 9.

The measurement of the average particle using a particle size distribution measuring apparatus revealed that secondary particles having a particle size of about 100 to 500 nm obtained by agglomeration of primary particles having a particle size of several tens of nm exist in Examples 1 to 7, Example 10 and Comparative Examples 1 and 2. To the contrary, in Examples 8 and 9 in which crushing was conducted by a physical impact, the average particle size was remarkably decreased and was about 35 nm.

It was revealed that, in all examples, the specific surface area of particles for catalyst is about several tens of $m^2/g$ and high specific surface area is maintained by decreasing the primary particle size through synthesis in a liquid phase.

OSC Measurement of Examples and Comparative Examples:

It is necessary to measure OSC capacity so as to confirm a function for a promoter (co-catalyst). Therefore, the OSC capacity was measured by the following procedure.

The method for measuring the OSC capacity is commonly a method using a TG (thermogravimetric) apparatus. 10% oxygen gas, 2% hydrogen gas and nitrogen gas were used as the gas. The concentrations of the oxygen gas and that of the hydrogen gas are concentrations in the total, namely, in a gas as mixed with the nitrogen gas. The measuring temperature was 500 or 800° C.

First, the sample was maintained in a 10% oxygen gas for a fixed time and then the amount of oxygen to be absorbed was measured by changing to a 2% hydrogen gas atmosphere. The oxygen amount was calculated by a change in weight of the sample and this value was taken as an oxygen absorbing amount.

The sample was maintained again in a 10% oxygen gas for a fixed time and then the amount of oxygen to be desorbed was measured by changing to a 2% hydrogen gas atmosphere.

The oxygen amount was calculated by a change in weight of the sample and this value was taken as an oxygen desorbing amount.

The following Table 1 is a table showing the measurement results of an oxygen absorbing amount and an oxygen desorbing amount with respect to Examples 1 to 10 and Comparative Examples 1 and 2. In Table 1, the unit of the numerical value is the number of mols of oxygen molecules ($O_2$) per 1 mol of a promoter ($O_2$ μmol/mol). The larger these numerical values, the more a function capable of absorbing and desorbing oxygen, namely, the OSC capacity becomes better.

TABLE 1

|  | Oxygen absorbing amount ($O_2$ μmol/mol) | | Oxygen desorbing amount ($O_2$ μmol/mol) | |
| --- | --- | --- | --- | --- |
|  | Measuring temperature | | | |
|  | 500° C. | 800° C. | 500° C. | 800° C. |
| Example 1 | 285 | 260 | 287 | 262 |
| Example 2 | 261 | 238 | 263 | 235 |
| Example 3 | 281 | 265 | 276 | 263 |
| Example 4 | 279 | 254 | 275 | 256 |
| Example 5 | 275 | 247 | 263 | 241 |
| Example 6 | 284 | 259 | 282 | 268 |
| Example 7 | 292 | 268 | 294 | 272 |
| Example 8 | 311 | 271 | 339 | 335 |
| Example 9 | 295 | 285 | 298 | 287 |
| Example 10 | 93 | 71 | 88 | 67 |
| Comparative Example 1 | 0 | 0 | 0 | 0 |
| Comparative Example 2 | 59 | 40 | 58 | 41 |

The particles for catalyst of Comparative Example 1 do not have any OSC capacity at all because oxygen defects do not exist in the particles. As shown in Examples 1 to 10, it was revealed that the OSC capability is remarkably improved by solid-soluting a divalent element.

A comparison with Comparative Example 2 revealed that the OSC capability was improved in all particles for catalyst of Examples 1 to 10, in contrast to a conventionally used ceria-zirconia solid solution, and the OSC capacity was improved by about 7 times at most.

In Examples 8 and 9 among the examples, the OSC capacity was slightly improved as compared with Examples 1 to 7 and 10. This reason is considered that the specific surface area of the particles for catalyst was improved by the effect of conversion into fine particles by applying a physical impact through ultrasonic waves, and thus the number of oxygen defects existing on the surface increased.

As is apparent from a comparison of Examples 1 to 9 and 10 with Comparative Example 1, the amount of the divalent element is preferably within a range from 1 to 10 atomic %. When the amount is less than 1 atomic %, sufficient OSC capability is not obtained because of a small amount of oxygen defects. On the other hand, when the amount is more than 10 atomic %, CaO particles are produced and the divalent element is not sufficiently solid-soluted, and thus a side effect arises.

With respect to the kind of the divalent element, Examples 1, 4 and 5 were compared. As a result, it was found that there is not a large difference in the OSC capacity and less influence due to the kind of the element is exerted when the element has two valences.

The auxiliary precipitant is not specifically limited as long as it can alkalify because there is less difference in the OSC capacity between Examples 1 and 6.

Comparing Example 1 with Example 7, the OSC capacity is slightly improved in Example 7, in which microwaves were used, and it is considered that the effect of increasing oxygen defect sites due to microwave is exerted.

As described above, the particles for catalyst of the present invention can further improve the OSC capacity as compared with conventional particles for catalyst and, for example, the OSC capacity was improved by about 7 times. In other words, this fact means that the amount of the catalyst can be decreased to about 1/7 of the original amount.

In Examples 1 to 7 and 10, a physical impact was not applied by ultrasonic waves, as in Examples 8 and 9, but the physical impact may be applied by ultrasonic waves in these examples.

In Example 1, a dispersion solution may be prepared by precipitating a precipitate containing trivalent Fe and Ca as a divalent element in Example 1, separating the precipitate and dispersing the precipitate in water and, then, a physical impact may be applied by irradiating this dispersion solution with ultrasonic wave.

In the particles for catalyst 10 shown in FIG. 1, a substance other than a Fe compound may be contained in the articles. In the particles for catalyst 20 shown in FIG. 2, a substance other than a Fe compound may be contained in layer 22.

The present invention can be applied to particles for catalyst having a function capable of absorbing and desorbing oxygen and a method for producing the particles for catalyst, and the application should not be limited to a promoter of an automobile exhaust gas purification catalyst.

The invention claimed is:

1. Particles for catalyst which have a function of absorbing and desorbing oxygen, said particles comprising an iron compound in which an element other than bivalent Fe is solid-soluted in an oxide of tervalent Fe; and
    a core portion formed from an oxide of tervalent Fe as a main component, and the iron compound constituting a layer formed on the outer peripheral surface of the core portion.

2. The particles for catalyst according to claim 1, comprising a primary particle size of 100 nm or less.

3. The particles for catalyst according to claim 1, wherein the element other than bivalent Fe is an alkali metal or a transition metal element.

4. The particles for catalyst according to claim 1, wherein, if the total proportion of tervalent Fe and the element other than bivalent Fe is 100 atomic % in the iron compound, the proportion of the element other than bivalent Fe is 1 atomic % or more and 10 atomic % or less.

5. The particles for catalyst according to claim 1, wherein:
    a first precipitate containing the tervalent Fe is precipitated from an aqueous solution containing ions of the tervalent Fe; and
    a second precipitate comprising the first precipitate and the element other than bivalent Fe is deposited on the surface of the first precipitate, from a solution prepared by mixing a dispersion containing the first precipitate dispersed therein with a solution containing ions of the element other than bivalent Fe, and
    the second precipitate is dried and fired.

6. The particles for catalyst according to claim 5, wherein:
    a dispersion is prepared containing the first precipitate dispersed therein,
    a physical impact is applied to the dispersion to crush the first precipitate, and
    dispersion is mixed with a solution containing ions of the element other than bivalent Fe.

* * * * *